United States Patent [19]

Altrieth, III

[11] Patent Number: 4,995,089

[45] Date of Patent: Feb. 19, 1991

[54] METHOD AND APPARATUS FOR PROVIDING FONT ROTATION

[75] Inventor: Frederick E. Altrieth, III, Scottsville, N.Y.

[73] Assignee: Eastman Kodak Company, Rochester, N.Y.

[21] Appl. No.: 461,970

[22] Filed: Jan. 8, 1990

[51] Int. Cl.⁵ .............................................. G06F 12/02
[52] U.S. Cl. ....................................... 382/46; 340/735
[58] Field of Search .................. 382/46; 340/727, 735, 340/748; 364/518, 521, 523

[56] References Cited

U.S. PATENT DOCUMENTS

| | | | |
|---|---|---|---|
| 3,422,419 | 1/1969 | Mathews et al. | 340/324 |
| 3,898,627 | 8/1975 | Hooker et al. | 340/172.5 |
| 4,000,486 | 12/1976 | Schomburg | 340/172.5 |
| 4,079,458 | 3/1978 | Rider et al. | 364/900 |
| 4,168,488 | 9/1979 | Evans | 340/146.3 H |
| 4,225,929 | 9/1980 | Ikeda | 364/521 |
| 4,545,069 | 10/1985 | Kermisch | 382/46 |
| 4,703,515 | 10/1987 | Baroody, Jr. | 382/46 |
| 4,716,544 | 12/1987 | Bartley | 382/46 |
| 4,829,452 | 5/1989 | Kang et al. | 382/46 |
| 4,929,085 | 5/1990 | Kajihara | 364/518 |
| 4,953,230 | 8/1990 | Kurose | 382/46 |

Primary Examiner—Stephen Brinich
Attorney, Agent, or Firm—Parkhurst, Wendel & Rossi

[57] ABSTRACT

A method and apparatus for enabling a printing device to print character data in either a portrait orientation mode or a landscape orientation mode is disclosed. Font data representing a character in a first orientation is stored in a font memory. Translated font data is generated that represents the translated top portion and bottom portion of the character. The data representing the translated top portion is stored adjacent to the original font data, while the data representing the translated bottom portion is stored in a separate area of the memory. In order to maintain a common addressing scheme for both translated and non-translated fonts, the translated and non-translated font data representing the lower portion of the character are interchanged prior to a printing operation when the printing mode is switched.

10 Claims, 10 Drawing Sheets

FIG. 8A — PORTRAIT ORIENTATION MODE

FIG. 8B — LANDSCAPE ORIENTATION MODE

METHOD AND APPARATUS FOR PROVIDING FONT ROTATION

BACKGROUND OF THE INVENTION

The present invention is related to a method and apparatus for providing font rotation. In particular, the present invention is related to a method and apparatus for enabling a printing device to print character data in either a portrait orientation mode or a landscape orientation mode.

Digital printing devices typically apply a digital bit stream to a printing head in order to print a desired character on a printing medium. The digital bit stream represents a number of individual pixels of the character and is used to selectively activate printing elements contained within the printing head in the proper order to cause the character to be printed on the printing medium. Common printing elements employed in the printing head include light emitting diodes (LEDs), electromagnetically activated printing pins, light valve arrays or ink-jet printing elements, that are selectively energized by the digital bit stream as the printing head is scanned across the printing medium or the printing medium is moved past the printing head. Alternatively, the digital bit stream can be used to modulate a scanning beam that moves across the printing medium.

One of the primary advantages of the printing devices described above is the ease at which different character fonts can be interchanged during a printing operation by simply changing the digital bit stream applied to the printing head. Thus, the style of character being printed (for example, from bold to italics or alphanumeric to graphics) and the character orientation (from portrait to landscape) can be readily changed "on the fly", i.e. during the printing operation, without requiring changes to the mechanical structure of the printing device.

Typically, the digital bit stream applied to the printing head is stored as a bit map representation of the character to be printed in a font memory device. A character code is assigned to each character to be printed and is used to address the font memory in order to retrieve the bit map representation of the character. The use of a font memory is illustrated, for example, in U.S. Pat. No. 3,898,627 issued to Hooker et al., which discloses an optical printer that utilizes a binary scanning beam to produce an image on an electrophotographic copy drum. A font memory is used to store a plurality of fonts including a character font having six lines per inch, a character font having five and one-third lines per inch, and a rotated character font.

There are drawbacks to the system described above, namely, that a large font memory must be employed in order to store the plurality of desired character fonts. Retrieving the character font data from the font memory is also complicated, as each character font is stored in a different segment of the memory and must be addressed separately. Efforts to reduce the amount of memory required to store the character fonts have included the concept of storing data for a single character font in a font memory and converting or translating the data for the single character font into data representative of a second character font. U.S. Pat. No. 4,703,515 issued to Baroody, Jr., for example, discloses an image rotation system that generates images for portrait, landscape, inverse portrait and inverse landscape modes, from a single bit map stored in a font memory.

Systems that perform the translation operation on data representing a single character font do effectively reduce the amount of memory required for font storage. These systems, however, also require a complex addressing scheme to translate the font data, particularly in the case of changing from a portrait mode of operation to a landscape mode of operation which requires rotation of the data. Delays associated with attempting to perform the rotation operation as the font data is read from the memory can be irritating to an operator of the printing device, even when the delay amounts to only a few seconds.

In view of the above, it is an object of the present invention to provide a font memory of simple and economical design which can be operated in a manner to rapidly switch between a variety of fonts. In particular, it is desirable to provide for rapid switching of fonts between a portrait orientation mode and a landscape orientation mode of operation without inducing delay which would be unacceptable to an operator.

SUMMARY OF THE INVENTION

The present invention provides a method and apparatus for translating a character font in a font memory from a first orientation to a second orientation utilizing a font overlapping technique, wherein a common area of the font memory is employed to store two different sets of character font data prior to the data being read from the font memory. A common addressing scheme can therefore be employed to address both character fonts.

In a preferred embodiment of the invention, portrait font data representative of a set of characters is loaded into a plurality of memory cells of a font memory. A translation operation is performed on the data to translate and rotate a top portion of each of the characters from a portrait orientation to a landscape orientation. The translated top portion of the characters is stored in a section of the memory cell that is adjacent and contiguous with the section of the memory cell used to store the portrait font data. The bottom portion of each character is also translated and rotated to the landscape orientation and is stored in a separate area of the memory cell. In order to maintain a common addressing scheme when reading the font data from the memory cell, the portrait font data representing the bottom of the character in the portrait orientation is switched with the landscape font data representing the bottom of the character in the landscape orientation. In other words, the same area of the memory cell is used to store the portrait font data and the landscape font data that represents the bottom of the character to be printed in the respective orientations.

The above-described overlapping technique enables rapid switching from portrait to landscape modes of printing, while providing a simple and straightforward addressing scheme. Other objects, features and advantages of the invention will become apparent in view of the accompanying detailed description of the preferred embodiment of the invention along with the drawings.

BRIEF DESCRIPTION OF THE DRAWINGS

With the above as background, reference should now be made to the following detailed description of the preferred embodiment along with the accompanying drawings for a more detailed explanation of the invention, wherein:

FIG. 5 illustrates font data stored in a memory cell prior to the request for a print operation;

DETAILED DESCRIPTION OF THE PREFERRED EMBODIMENT

Figure 1:
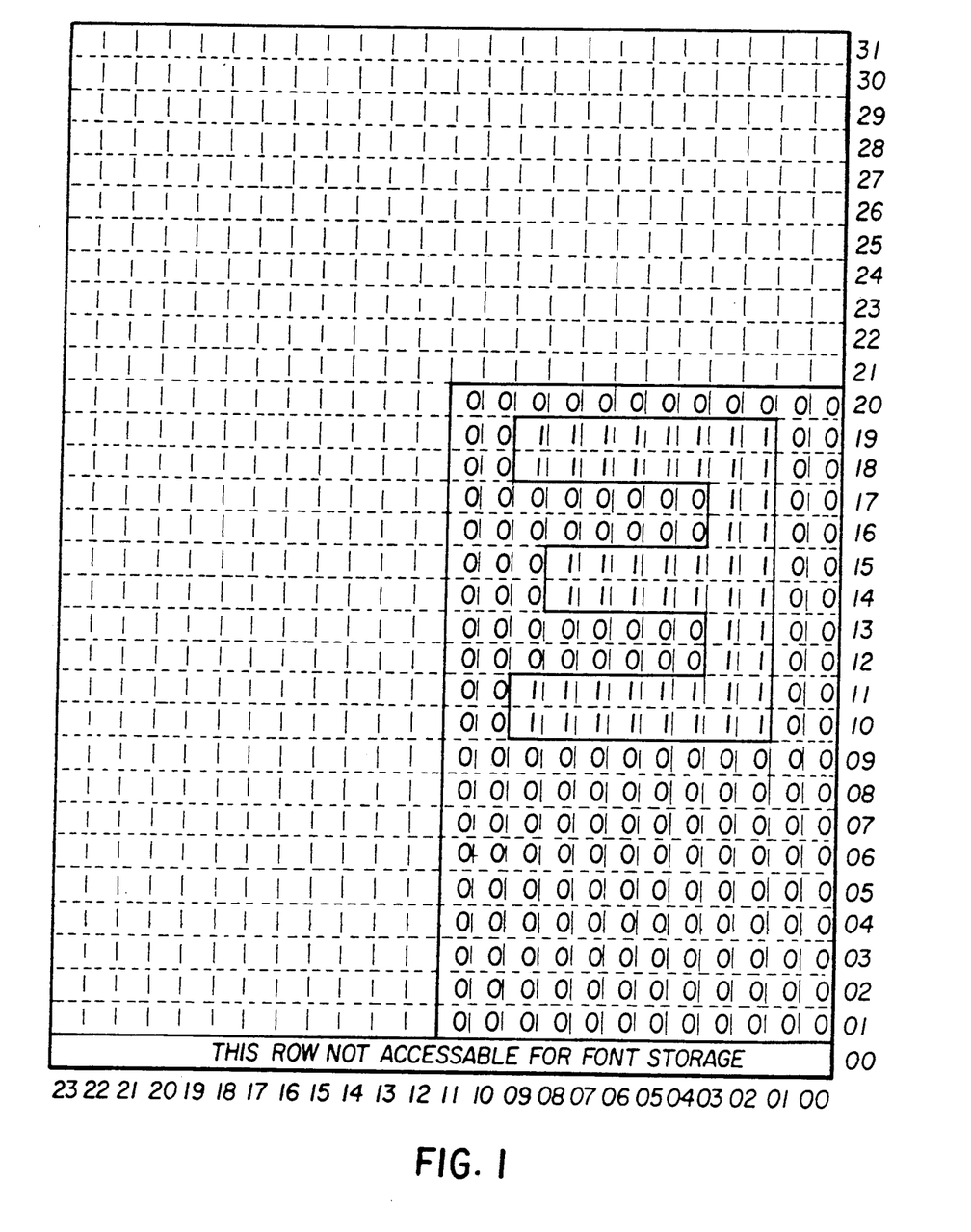
FIG. 1 is a bit map representation of a character stored in a portrait orientation.

The basic concept of font overlapping will be described with reference to FIGS. 1-6, which illustrate a single memory cell of a font memory having 32 rows and 24 columns. Row 00 of the illustrated memory cell is not addressable for purposes of character font data storage, thus character font data is stored starting in row 01 of the memory cell. Each memory cell is used to store data representative of a single character in both a portrait and landscape orientation. A logic "1" is stored in each memory bit location within the memory cell that represents a pixel to be printed by a print head of a printing device. FIG. 1, for example, illustrates a bit map representation of the portrait character "E" as being stored in rows 01-20, columns 00-11 of the memory cell. Thus, the portrait font data in illustrated example resides in a 12 column×20 row array within the memory cell.

In the illustrated example, the character data is actually stored in the memory cell as a mirror image of how the printed character will appear. The requirement for storing the data as a mirror image is related to the printing apparatus employed in a preferred implementation of the font memory that will be described in greater detail below. The invention, of course, is not limited to the particular orientation of character font data illustrated.

Figure 2:
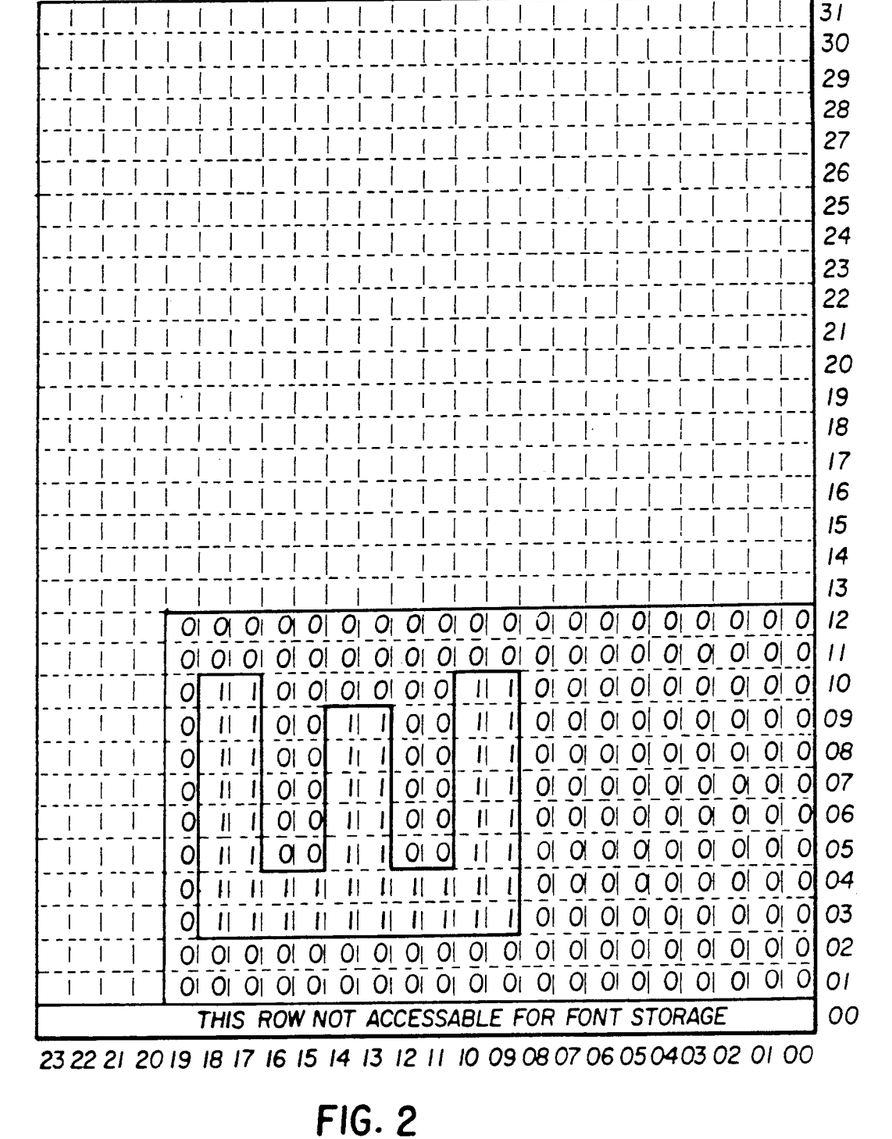
FIG. 2 is a bit map representation of a character stored in a landscape orientation.

The character font data is retrieved from the memory cell by reading each column within the array starting from the highest order column (column 11 for the portrait font data illustrated in FIG. 1 example) to column 00. The bit map representation for the landscape font is stored in the memory cell as illustrated in FIG. 2, in order to store a landscape font for the character "E" in the same memory cell while maintaining the same addressing scheme. In other words, the landscape font consists of a 20 column×12 row array that is read out in the same manner as the portrait font, namely, by starting at the highest order column.

As can be readily seen from FIGS. 1 and 2, a lower portion of both the portrait font and the landscape font are stored in a common area of the memory cell in order to maintain the addressing scheme. Specifically, the area of the memory cell defined by the memory locations row 01-column 00, row 01-column 11, row 12-column 00, and row 12-column 11, is used for both the lower portion of the portrait font and the landscape font. In practice, of course, data representative of both the bottom portion of the portrait font and the bottom portion of the and landscape font cannot be simultaneously stored in the same memory locations. Thus, the lower portion of the character font data must be switched when changing between landscape and portrait modes of operation.

Figure 3:
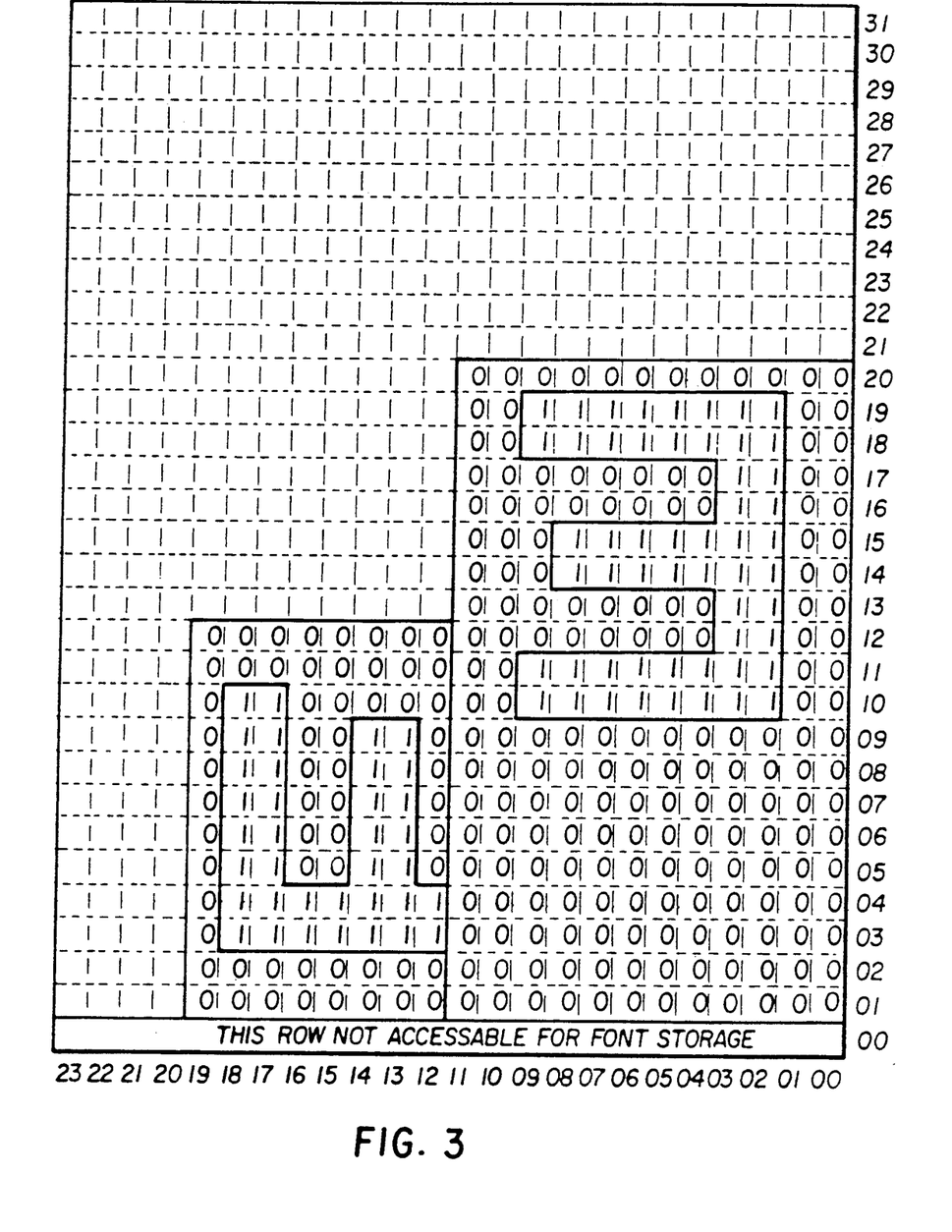
FIG. 3 illustrates a top portion of the portrait character translated and stored in an area of a memory cell that is adjacent and contiguous with the area used to store the portrait character.

A preferred method of accomplishing the switching of the font data will be discussed below with reference to FIGS. 3-6. The portrait font data is loaded into the memory cell as illustrated in FIG. 1. The top portion of the portrait font is then translated and stored in the memory cell as illustrated in FIG. 3. Translation is accomplished by mapping each bit from the portrait font into a corresponding landscape font bit location. For example, the data stored at portrait font memory location row 20-column 11 read by a processor. If a logical "1" is stored in the portrait font memory location, the processor writes a "1" in the corresponding landscape font memory location row 12-column 19. A look-up table can be used to match the portrait font memory locations with their corresponding landscape font memory locations. It is not necessary to write "0" data to landscape font memory locations if all the memory locations within the memory cell are initialized to "0" prior to loading the font data.

Figure 4:
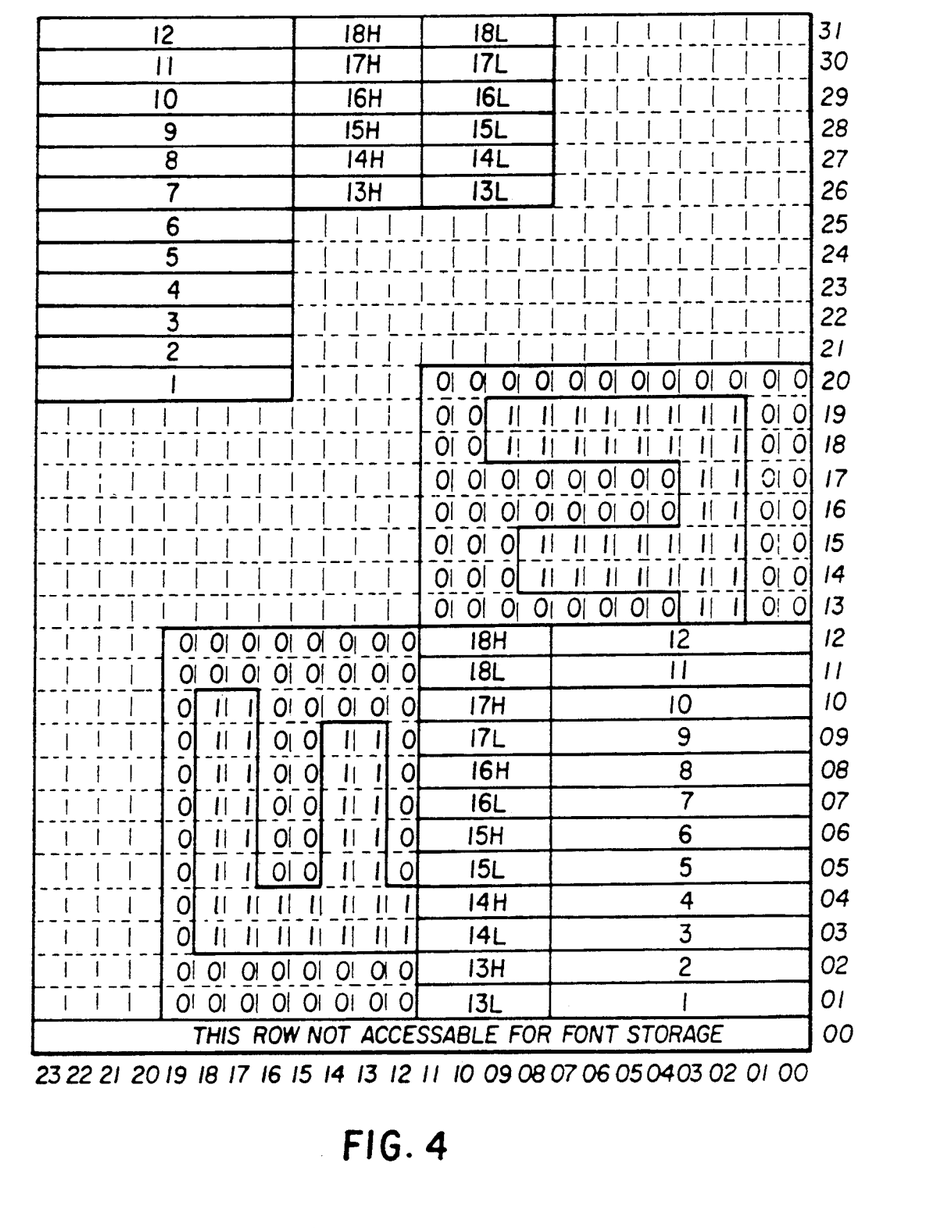
FIG. 4 illustrates the mapping of a common area of a memory cell used to store the lower portion of both a portrait character and a landscape character.

The lower portion of the portrait font data is also translated, but this data is stored in a separate area located in the upper left corner of the memory cell. For example, FIG. 4 illustrates a preferred method of mapping the translated lower portion of the portrait font data to the separate memory area in eight bit bytes (1-12) and four bit words (13L-18H). Thus, prior to the start of any printing operation, the portrait font data and landscape font data for the character "E" are loaded in the memory cell as illustrated in FIG. 5.

Figure 6:
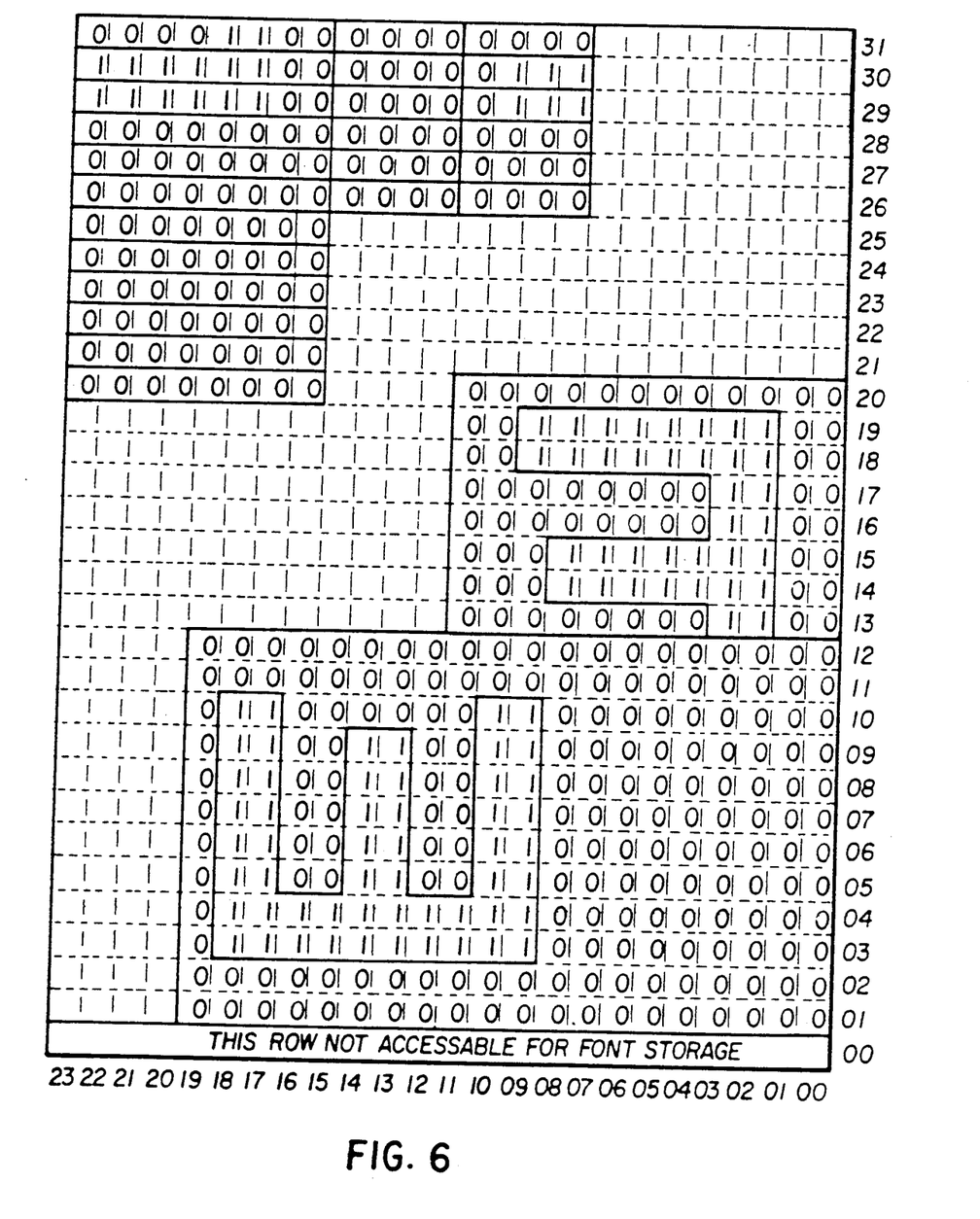
FIG. 6 illustrates font data stored in a memory cell after a switch from portrait mode to landscape mode of operation has been requested.

The data will remain in the memory cell as illustrated in FIG. 5 until a switch from portrait orientation mode to landscape orientation mode is required. Upon switching from portrait to landscape mode, the lower portion of the portrait font data is swapped with the lower portion of the landscape font data previously stored in the separate memory area within the memory cell. This data swapping can be accomplished using block moves that do not require the translation of the data within a block, as the data has already be translated to the correct orientation when it was originally stored in the separate memory area. Thus, the switch between portrait and landscape orientation can be accomplished rapidly without any noticeable delay to the operator. FIG. 6 illustrates the mapping of the memory cell after the switch from portrait to landscape mode has been completed.

The above-described method provides the advantage that the same addressing scheme is used to read out both the portrait font data and the landscape font data. Further, the size of the character font array within the memory cell can be easily adjusted for compressed fonts, etc., without changing the basic addressing scheme. In each case, the character font data is read from the memory cell by sequentially reading the columns starting at the highest order column and decrementing to column 00. The only variables that need to defined are the highest order column and the number of rows to be read out from each column. In other words, the size of the character font array within the memory cell must be defined, which can be accomplished easily by the use of counters as will be discussed in greater detail below.

Figure 7:
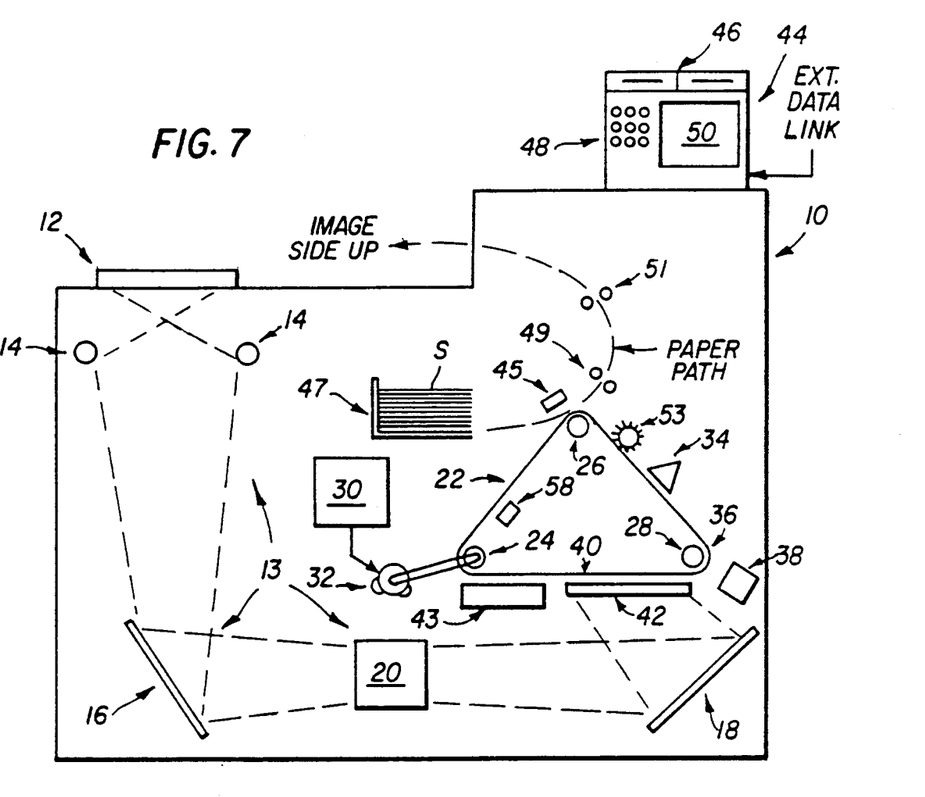
FIG. 7 is a schematic diagram of an electrophotographic reproduction apparatus in accordance with the invention.

Referring now to FIG. 7, an electrophotographic reproduction apparatus 10 in accordance with the present invention is shown including an original platen 12 constructed from a transparent material such as glass, an optical system 13 including an exposure lamps 14, mirrors 16-18, and a lens block 20 which is provided for purposes of magnification or reduction of the original image, and a photoconductive web 22. In operation, an original document is illuminated with light generated by the exposure lamps 14. The reflected light is transmitted via mirror 16, lens block 20, and mirror 18 to the photoconductive web 22.

The photoconductive web 22 is trained about three transport rollers 24-28 to form an endless loop, and rotates about the transport rollers 24-28 when an activation signal is supplied from a control unit 30 to a drive motor 32. The drive motor 32 is coupled to transport roller 24 by a drive mechanism such as a shaft or belt. The photoconductive web 22 passes a series of electrophotographic work stations including a charging station 34, a first exposure station 36, a second exposure station 40, a development station 43, a transfer station 45, and a fuser station 49, as it is driven by the drive motor 32.

The charging station 34 is provided to sensitize the surface of the photoconductive web 22 by applying a uniform electrostatic primary charge of a predetermined voltage to its surface. The output of the charging station 34 is controlled by a grid connected to a programmable power supply (not shown). The power supply is in turn controlled by the control unit 30 to adjust the voltage level applied to the surface of the photoconductive web 22.

The photoconductive web 22 rotates from the charging station 34 to the first exposure station 36 where the primary charge applied to the photoconductive web 22 is modified in order to form an electrostatic image thereon. More specifically, a print head 38 is provided that includes a plurality of point-like radiation sources that are selectively energized by signals provided by the control unit 30, in order to write characters to the photoconductive web 22. Preferably, the print head 38 includes a linear array of light emitting diodes (LEDs) and associated optics for focusing the light from each of the LEDs onto the photoconductive web 26, and has a resolution of at least 120 dots per inch (dpi). Other types of print heads may be readily employed depending on the particular printing application.

The control unit 30 controls the activation of the print head 38 in accordance with data received from an operator control unit 44 that includes a disc drive unit 46, keypad 48 and display unit 50. The operator control unit 44 is provided to enter various control parameters such as the number of copies desired, exposure level, duplexing information, etc., to the control unit 30. The disc drive unit 46 is used to download character page information and font data to the control unit 30 as will be described in greater detail below. The various control parameters selected via the keypad 48 and machine operating status information are displayed on the display unit 50 for the operator's convenience.

The second exposure station 40 is provided to modify the electrostatic charge on the photoconductive web 22 based on light reflected from an original document placed on the platen 12. The light reflected from the original document is focused on the photoconductive web 22 by the mirror 18. The reflected light forms an electrostatic image on the photoconductive web 22 by modulating the primary charge applied to the surface of the photoconductive web 22 by the charging station 34.

The second exposure station 40 also includes a shutter mechanism 42 that can be employed to selectively block a portion of the light reflected by mirror 18, thereby selectively "erasing" a portion of the original image from the electrostatic image to be formed on the photoconductive web 22 at the second exposure station 40. In other words, the shutter mechanism 42 prevents a portion of the original image from being reproduced thereby effectively "erasing" a portion of the original image from the copied image. The erased portion is preferably located at the top or bottom of the image as viewed by an observer, and character data can be written in the erased portion if desired by activating the print head 38 at the first exposure station 36. In a preferred embodiment, the shutter mechanism 42 includes a blade that is driven by a motor to cover a portion of the photoconductive web 22.

The photoconductive web 22 then passes a development station 43 that includes a developer which may consist, for example, of iron carrier particles and electroscopic toner particles with an electrostatic charge opposite to that of the latent electrostatic image formed on the surface of the photoconductive web 22. The development station 43 includes a mechanism (not shown) for brushing or applying the developer over the surface of the photoconductive web 22 to form a toned image. Alternatively, the toner particles may have a charge of the same polarity as that of the latent electrostatic image and develop the image in accordance with known reversal development techniques.

After passing the development station 43, the photoconductive web 22 rotates past the transfer station 45, at which time the toned image on the photoconductive web 22 is transferred to a copy sheet S that is supplied from a paper supply 47. The copy sheet S is transported to the fuser station 49, which includes a heated pressure roller, and the toned image is fixed to the copy sheet S. The copy sheet S is subsequently transported and discharged from the reproduction apparatus 10 via a transport mechanism 51 along a paper path.

Residual toner particles remaining after the toned image has been transferred from the photoconductive web 22 to the copy sheet S are removed from the photoconductive web 22 at a cleaning station 53. The cleaning station 53 is preferably located prior to the charging station 34 along the transport path of the photoconductive web 22.

The photoconductive web 22 has a plurality of indicia, such as perforations along one of its edges, that are used to coordinate the operation of the various work stations with the its movement. A sensor 58 is positioned at a suitable location along the transport path of the photoconductive web 22 to sense the perforations which are spaced at equal distances. Signals generated by the sensor 58 are supplied to the control unit 30 which controls the overall operation of the electrostatic reproduction apparatus 10.

Figure 8A:
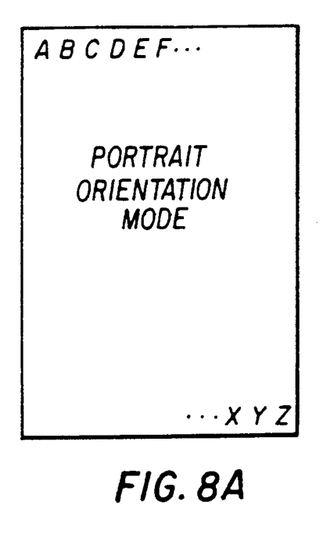
FIGS. 8A and 8B illustrate portrait and landscape orientations of a printed page as viewed by an observer.
Figure 8B:
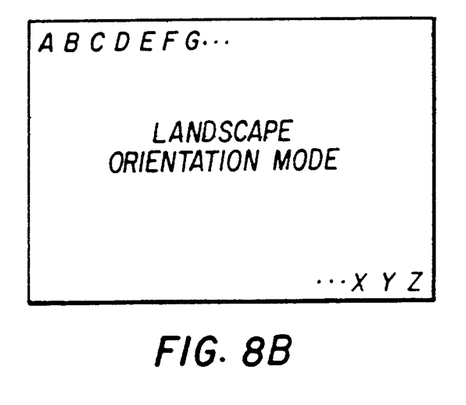

The illustrated electrostatic reproduction apparatus 10 is capable of operating in four basic modes. The first mode is a normal optical copy operation mode in which an original is placed on the platen 12 and the control unit 30 controls the operation of the various components described above to duplicate the entire original document. The second mode of operation is a selective an optical-electronic mode in which the shutter mechanism is used to selectively block a portion of the original image from being reproduced. In the second mode, the control unit 30 can selectively control the operation of the print head 38, based on data received from the operator control unit 44, to print character data on the photosensitive web 22 in the area to be blocked by the shutter mechanism prior to the photosensitive web 22 reaching the second exposure station 40. The third mode of operation is a fully electronic mode in which the photoconductive web 22 is not exposed at the second exposure station and character data is written to the photoconductive web 22 solely by the use of the print head 38. A fourth mode of operation is also possible, in which a black patch is placed over a selected area of the original document in order to prevent that portion of the document from being reproduced. The print head 38 can then be used to write character information in the in the area blocked by the patch. In both the second and third modes of operation, the character data can be written to the copy sheet S in either a portrait or landscape orientation as illustrated in FIGS. 8A-8B.

Figure 9:
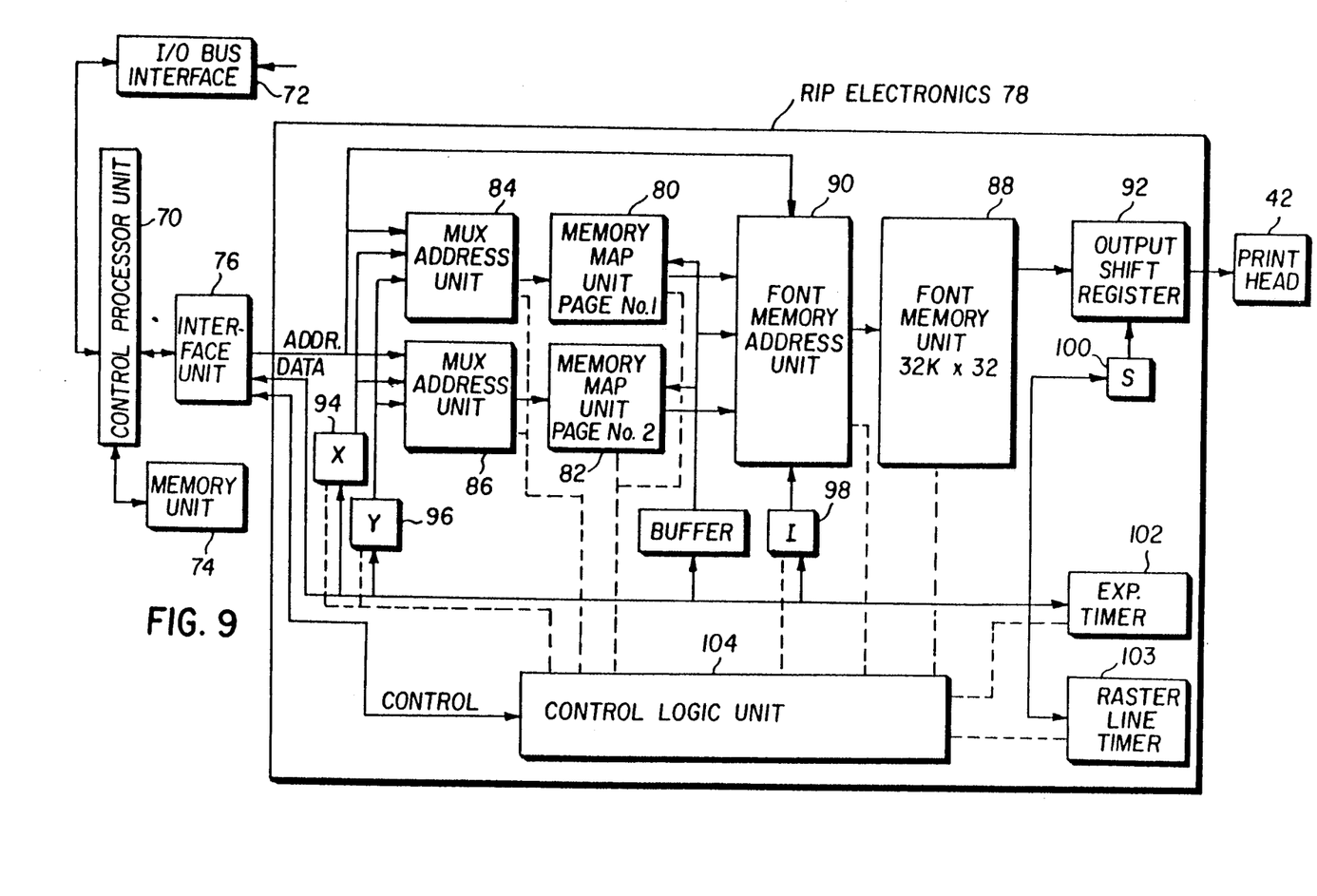
FIG. 9 is a schematic block diagram of a control unit employed in the reproduction apparatus illustrated in FIG. 7.

The structure of the control unit 30 will be discussed in greater detail with reference to FIG. 9. The control unit 30 includes a control processor unit 70 coupled to an I/0 bus interface unit 72 and a memory unit 74. The I/0 bus interface unit 72 couples the control processor unit 70 to the operator control unit 44 and various sensors, such as sensor 58, so that various input signals can be provided to the control processor unit 70. The I/0 bus interface unit 72 also links the control processor unit 70 to various output devices, such as drive motor 32, in order to permit the control processor unit 70 to control various machine functions. In a preferred embodiment, the control processor unit 70 includes a plurality of individual microprocessor units, each of which are dedicated to performing particular tasks.

The control processor unit 70 is also coupled to raster image processing (RIP) electronics unit 78 via interface unit 76. The RIP electronics unit 78 controls the operation of the print head 42 and includes two memory map units 80 and 82—respectively designated as Page #1 and Page #0—and their associated addressing units 84 and 86, a font memory unit 88, a font memory addressing unit 90, an output shift register 92, an X counter 94, a Y counter 96, an I counter 98, an S counter 100, an exposure timer 102, and a raster line timer 102. The output shift register 92 is coupled to the print head 38 and converts parallel data received from the font memory unit 88 to a serial bit stream which is used to selectively energize the LEDs contained in the print head 38. The raster line timer 103 controls the total time defined for spacing each raster line (i.e. row) of pixels to be printed. The exposure timer 102 controls how long the LEDs of the print head 38 are activated.

The X counter 94 and the Y counter 96 are used to define the number of characters on a page to be stored in the memory map units 80 and 82. The X counter defines the number of characters to be printed across the page in the horizontal direction from the observer's perspective regardless of orientation. The Y counter defines the number of characters to be printed in the vertical direction on the page from the observer's perspective regardless of orientation.

Figure 10:
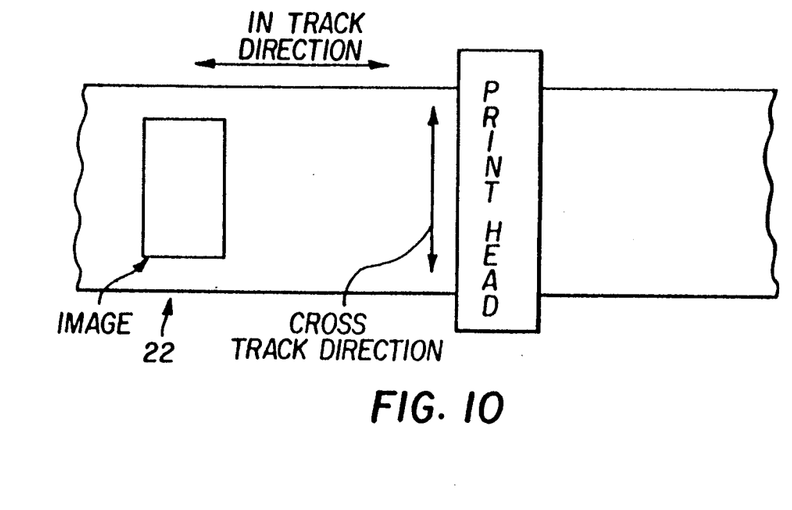
FIG. 10 illustrates intrack and crosstrack orientations with respect to a photoconductive web and linear print head employed in the reproduction apparatus illustrated in FIG. 7.

The S counter 100 and the I counter 98 control the number of pixels crosstrack and intrack, respectively, for each character to be printed. The intrack direction is defined as direction of travel of the photoconductive web 22 which is perpendicular to the linear array of LEDs contained within the print head 38. The crosstrack direction is defined as the dimension of the character to be printed that is parallel with the linear array of LEDs contained within the print head 42. FIG. 10 illustrates the crosstrack and intrack directions with respect to the print head 38 and the photoconductive web 22.

The overall sequence of operation of the RIP electronics 78 is controlled by a control logic unit 104 which is coupled to the control processor unit 70 via the interface unit 76. The control logic 104 can be implemented using either a state machine employing PLD logic or a microsequencer device such as the ALTERA EP488 or AMD PL141. The control logic 104 controls the overall operation of the RIP electronics 78 including the memory map addressing units 84 and 86, font addressing unit 90, X counter 94, Y counter 98, etc., in order to generate the output bit stream that is supplied to the print head 38 via the output shift register 92.

The control processor unit 70 supplies four basic signals to the RIP electronics unit 78: a page valid (PVLD) signal is used to indicate that a page of character data currently available to the control processor unit 70 is valid; a start (START) signal is employed to initiate the writing of data to the print head 38; a landscape/portrait (L/P) signal is used to indicate that the character data is either in the portrait or landscape orientation to the control logic unit 104, which controls the addressing of the memory map units and font memory unit accordingly; and a run/halt (RUN) signal which either halts or permits the RIP electronics unit 78 to run depending on its state. The RUN signal must be asserted (run state) to permit the control processor access to the memory map units and must indicated a halt state to permit the control processor access to the font memory unit.

The RIP electronics unit 78 also supplies four control signals to the control processor unit 70 including: an error (ERROR) signal that indicates the control logic unit 104 has entered an illegal state and requires the control processor unit 70 to halt the operation of the RIP electronics by asserting RUN as a low logic level; a page (Pl/0) signal that indicates to the control processor unit 70 which memory map is being addressed by the control logic unit 104; page acknowledge (PACK) which is asserted when PVLD is asserted, START is not asserted, and the RIP electronics unit 78 is not processing a page of character data, i.e., this signal indicates to the control processor unit 70 that the RIP electronics unit 78 has received the PVLD signal is ready for START to be asserted; and an idle (IDLE) signal that indicates the RIP electronics unit 78 is not processing any data and has not yet received the PVLD signal.

Font data is downloaded to the font memory unit 88 from the disc drive unit 46 upon installation of the reproduction apparatus 10. The font memory unit includes a battery backup to permit the reproduction apparatus 10 to be powered off without requiring the font data to be reloaded. It should be noted that the font data downloaded from the control processor unit 70 to the font memory unit 88 is preferably in the portrait orientation mode as illustrated in FIG. 1. The control processor unit 70 performs a translation operation on the font data to generate font data for the landscape orientation mode. As described previously with reference to FIGS. 1-6, the bottom portion of each portrait character stored in the font memory unit 88 is translated by the control processor unit 70 and stored in a section of each memory cell that is adjacent and contiguous with the section used to store the portrait character, and the bottom portion of each character is translated and stored in a separate section of the memory cell. Thus, before any print operation begins, the font memory unit 88 is loaded with font data in the manner illustrated in FIG. 5.

The basic operation of the reproduction apparatus 10 will now be described. The operator initiates machine operation by activating a power on switch provided on the operator control unit 44. With the application of power, the control processor unit 70 begins an initialization routine to set various control signals in order to ready the reproduction apparatus 10 for operation. The operator then selects one of the four modes of operation described above. If the first mode is selected, the reproduction apparatus 10 is controlled by the control unit 30 to function as a conventional copying apparatus. If the one of the other modes is selected, however, the operator is prompted via the display unit 50 to indicate the name of the file to be electronically printed and the desired font. Alternatively, the font information can be included as part of the file. The control processor unit 70 then access the disc drive unit 46 and fills one memory map unit, for example page #1, with the character representation of the first page, i.e., a page layout, to be printed from the selected file.

Figure 11:
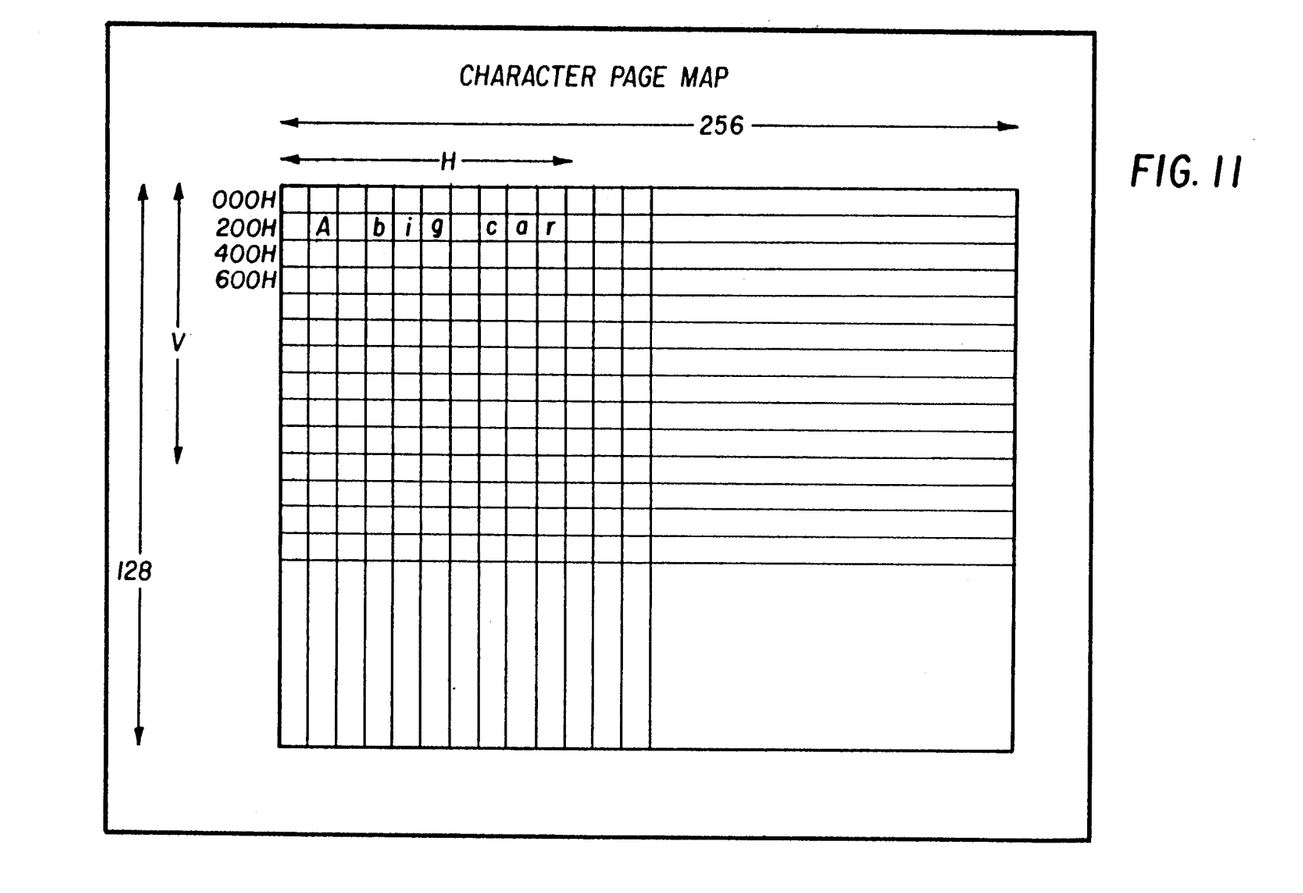
FIG. 11 illustrates a page memory employed in the control unit illustrated in FIG. 9.

As illustrated in FIG. 11, each memory map unit is preferably arranged to allow up to 256 characters in the horizontal direction, and 128 characters in the vertical direction, each character being defined by a rectangular array I columns wide and S rows high. Only those character locations that will be printed need to be filled with valid data. Once one page becomes filled, the control processor unit 70 fills the alternate memory map while the data contained in the first memory map is applied to the font memory unit 88 by the control logic 104 to generate the output bit stream for the first page.

As previously mentioned, the X counter 94 and the Y counter 96 are used to control the addressing the memory map units 80 and 82, and must be initialized by the control processor unit 70 prior to the filling of the memory map units 80 and 82 with character page data. For example, if the operator selects a portrait printing mode of printing on 8½ × 11 paper with ten characters per inch (c.p.i.) and six lines per inch (l.p.i.), the X counter 94 is loaded with the value 84 and the Y counter is loaded with the value 66 indicating that 84 characters in the horizontal direction and 66 characters in the vertical direction, as viewed by the observer regardless of orientation, can be loaded in the memory map units.

The output values from the X counter 94 and the Y counter 96 are supplied to the MUX addressing units 84 and 86. When loading a portrait oriented page of data, the value from the X counter 94 is used to control the addressing of the columns in the memory map units 80 and 82 and the value from the Y counter 96 is used to control the addressing of the rows in memory map units 80 and 82. The page data is loaded in the memory map units 80 and 82 by successively filling the columns starting from the highest order column to the lowest order column. Thus, addressing begins with the character located at the lower righthand corner of the page as viewed by the observer and continues up the page by decrementing the Y counter until the column is filled. The X counter 94 is then decremented and the next column is filled. Data is read out from the memory map units 80 and 82 in the same order.

In the illustrated embodiment, the X counter 94 is always loaded with the number of characters to be printed in the horizontal direction as viewed by the observer. Thus, if a portrait page of data is stored in the memory map units 80 and 82, the value of the X counter 94 must be used to control row addressing in the memory map units 80 and 82 and the value of the Y counter must be used to control column addressing. The control logic unit 104 controls the Mux addressing units 84 and 86 in a manner to switch the application of the X and Y counter values based on the L/P signal supplied by the control processor unit 70.

Figure 12:
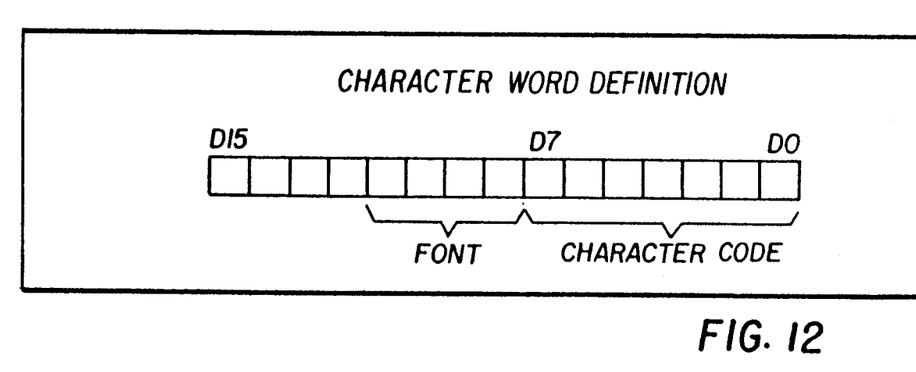
FIG. 12 illustrates a character word to be stored in the page memory of the control unit illustrated in FIG. 9.

The character representation stored in the memory map units 80 and 82 can consist of alphanumeric or graphic characters (for example ASCII coded characters) supplied to the control processor unit 70 via the keypad 48, the disc drive unit 46 or by some other external data source, for example a personal computer (PC), via a data link. Each character to be stored in the memory map includes a character word having a character code and a font number as illustrated in FIG. 12. As explained above, bit map representations for each character code of each font number are stored in the font memory unit 88 by the control processor unit 70 upon initialization. Thus, multiple portrait fonts can be stored in the font memory unit 88 with an assigned font number (for example bold, italics, etc.) and a landscape font can be generated, if desired, for each portrait font.

The font memory unit 88 is constructed as a lookup table, the address of which is defined by the font number, plus the character code, plus the raster line number (provided by the I counter) within the character cell. Thus, the character words from the memory map units 80 and 82 are combined with the output of the I counter to address the bit map representation stored in the font memory unit 88. In other words, the character words retrieved from the memory map units 80 and 82 indicate the location of the particular memory cell to address within the font memory, and the value of the I counter 98 is used to address a particular column within the memory cell. As mentioned above, the character words are retrieved from the memory map units 80 and 82 column by column starting at the lower righthand corner of the page. Thus, the I counter 98 is not decremented until the column of data in each memory cell for each character to be printed in a given column of the page has been supplied to the output shift register 92.

The data in the addressed column of the memory cell is transferred in parallel to the output shift register 92. As illustrated in FIG. 1, each memory cell has thirty two rows in each column, but only twenty rows contain font data that needs to be supplied to the print head in the portrait orientation. The S counter 100 is used to control the operation of the output shift register 92 so that data from only those rows containing font data is actually supplied to the print head. In a preferred embodiment, a 5 MHz clock signal is supplied to the output shift register 92 to shift out data. The S counter 100 acts as a timer to terminate the application of the clock signal to the output shift register 92 after the desired number of bits of data have been shifted out in serial form to the print head.

The I counter 98 and the S counter 100 are also initialized by the control processor unit 70 based on the mode of printing selected. For example, in a portrait orientation mode shown in FIG. 1, the counter 94 is loaded with the value twelve and the S counter 100 is loaded with the value twenty. The counters are reloaded when switching to a landscape printing mode, but the basic addressing scheme remains the same, i.e., each memory cell is addressed starting at the highest order column.

It will be readily appreciated from the above that switching back and forth between portrait and landscape printing modes can be accomplished rapidly while maintaining a common addressing scheme. The control processor unit 70 simply performs block data moves to switch the bottom portion of the character data stored in the memory cells of the font memory unit 88 with the translated data stored in a separate area of the memory cells, resets the counters, and signals the control logic unit 104 to switch the addressing to the memory map units 80 and 80. The block data moves are accomplished rapidly as the data has already be translated on initialization.

The invention has been described with reference to certain preferred embodiments therefore, it will be understood, however, that modifications and variations may be effected within the scope of the appended claims. The invention is not limited to the particular electrostatic printing device illustrated or to electrostatic printing devices in general, but can be incorporated into any type of digital printing device that supplies a digital bit stream to a printing head including, but not limited to, ink-jet printers, laser printers, and photographic printers.

What is claimed is:

1. A method for providing font data comprising the steps of:
   (a) storing font data representative of a character in a first orientation in a first section of a memory cell of a font memory unit, said first section of said memory cell being divided into a top portion and a bottom portion;
   (b) generating first translated font data representative of a second orientation of a portion of said character from said font data stored in said top portion of said first section and storing said first translated font data in a second section of said memory cell adjacent to said first section;
   (c) generating second translated font data representative of a second orientation of a further portion of said character from said font data stored in said bottom portion of said first section and storing said second translated font data in a third section of said memory cell; and
   (d) switching said font data stored in said bottom portion of said first section with the second translated font data stored in said third section of said memory cell to change from a first printing mode to a second printing mode.

2. A method for providing font data as set forth in claim 1, further comprising the step reversing the switching operation performed in step (d) to switch from said second printing mode back to said first printing mode.

3. An apparatus comprising:
   means for storing font data representative of a character in a first orientation in a first section of a memory cell of a font memory unit, said first section of said memory cell being divided into a top portion and a bottom portion;
   means for generating first translated font data representative of a second orientation of a portion of said character from said font data stored in said top portion of said memory cell and storing said first translated font data in a second section of said memory cell adjacent to said first section;
   means for generating second translated font data representative of a second orientation of a further portion of said character from said font data stored in said bottom portion of said first section and storing said second translated font data in a third section of said memory cell; and
   means for switching said font data stored in said bottom portion with said second rotated font data stored in said third section of said memory cell in response to a signal indicative of a change in printing modes.

4. An apparatus as claimed in claim 3, further comprising means for addressing said first section of said memory cell as a first array having I columns and S rows in a first printing mode and addressing said second section and said bottom portion of said first section as a second array having I columns and S rows in a second printing mode, wherein data is retrieved from the highest order column to the lowest order column of said first and second arrays in said first and second printing modes respectively.

5. An apparatus comprising:
   an exposure station including a print head;
   a control unit coupled to said exposure station for controlling the operation of said print head to form an image on a printing medium, said control unit including means for storing font data representative of a character in a first orientation in a first section of a memory cell of a font memory unit, said first section of said memory cell being divided into a top portion and a bottom portion, means for generating first translated font data representative of a second orientation from said font data stored in said top portion of said memory cell and storing said first translated font data in a second section of said memory cell adjacent to said first section; means for generating second translated font data representative of a second orientation from said font data stored in said bottom portion of said memory cell and storing said second translated font data in a third section of said memory cell; means for switching said font data stored in said bottom portion with said second rotated font data stored in said third section of said memory cell in response to a signal indicative of a request for a change in printing modes, and means for addressing said memory cell to retrieve said font data stored therein.

6. An apparatus as claimed in claim 5, further comprising a development station for developing said image formed on said printing medium by said print head.

7. An apparatus as claimed in claim 6, wherein said printing medium is an electrostatic web formed as a continuous loop and rotated by a drive mechanism.

8. An apparatus as claimed in claim 7, further comprising a charging station located prior to said exposure station in relation to the direction of travel of said electrostatic web as it is rotated by said drive mechanism, a second exposure station located subsequent to said exposure station in relation to the direction of travel of said electrostatic web, and an optical system for providing a reflected image of an original document to said second exposure station.

9. An apparatus as claimed in claim 8, wherein said second exposure station includes a shutter mechanism for selectively blocking a portion of said reflected image.

10. An apparatus as claimed in claim 5, wherein said means for addressing comprises means for defining said first section of said memory cell as a first array having I columns and S rows in a first printing mode and defining said second section and said bottom portion of said first section as a second array having I columns and S rows in a second printing mode, wherein data is retrieved from the highest order column to the lowest order column of said first and second arrays in said first and second printing modes respectively.

* * * * *